Patented May 5, 1925.

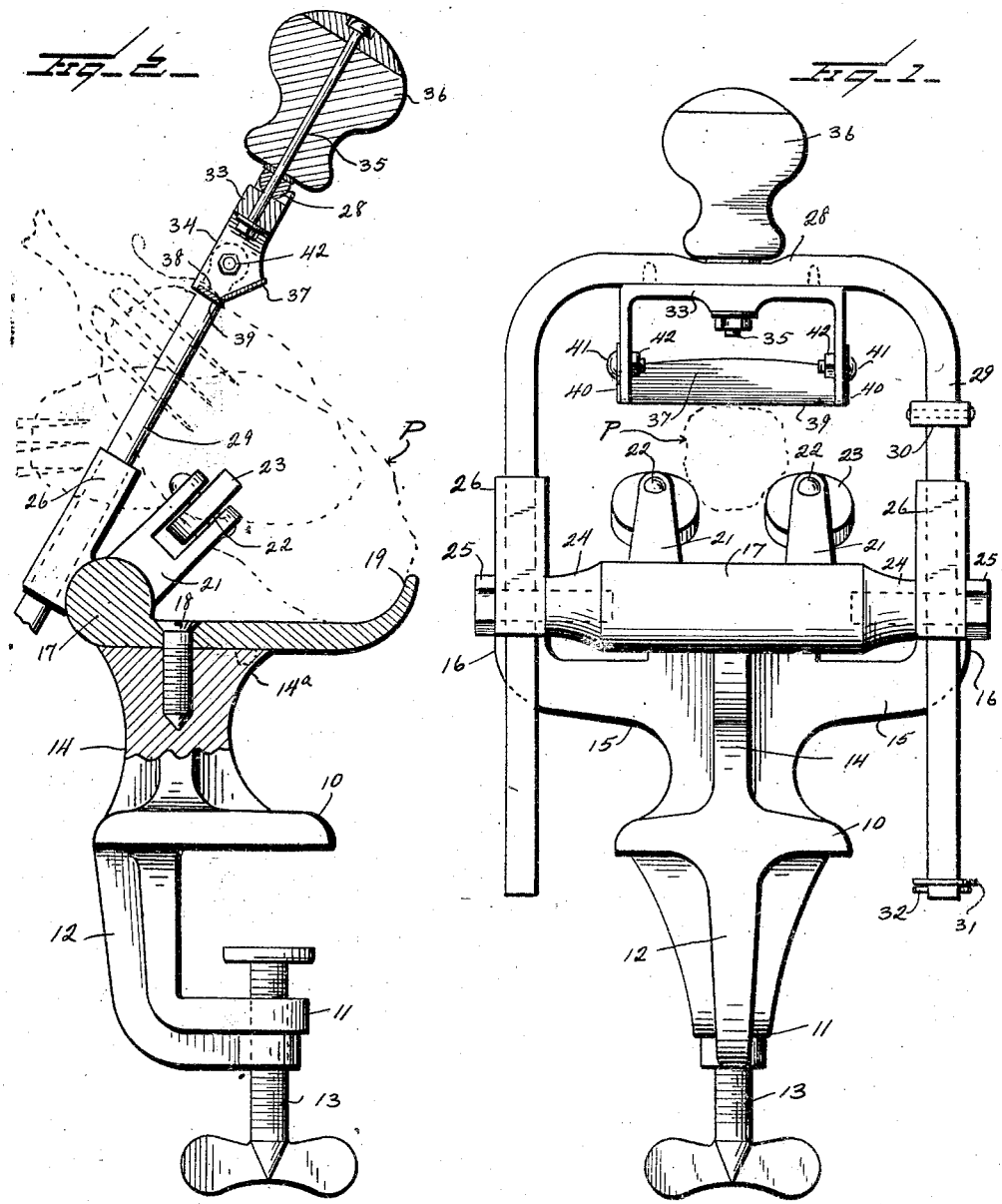

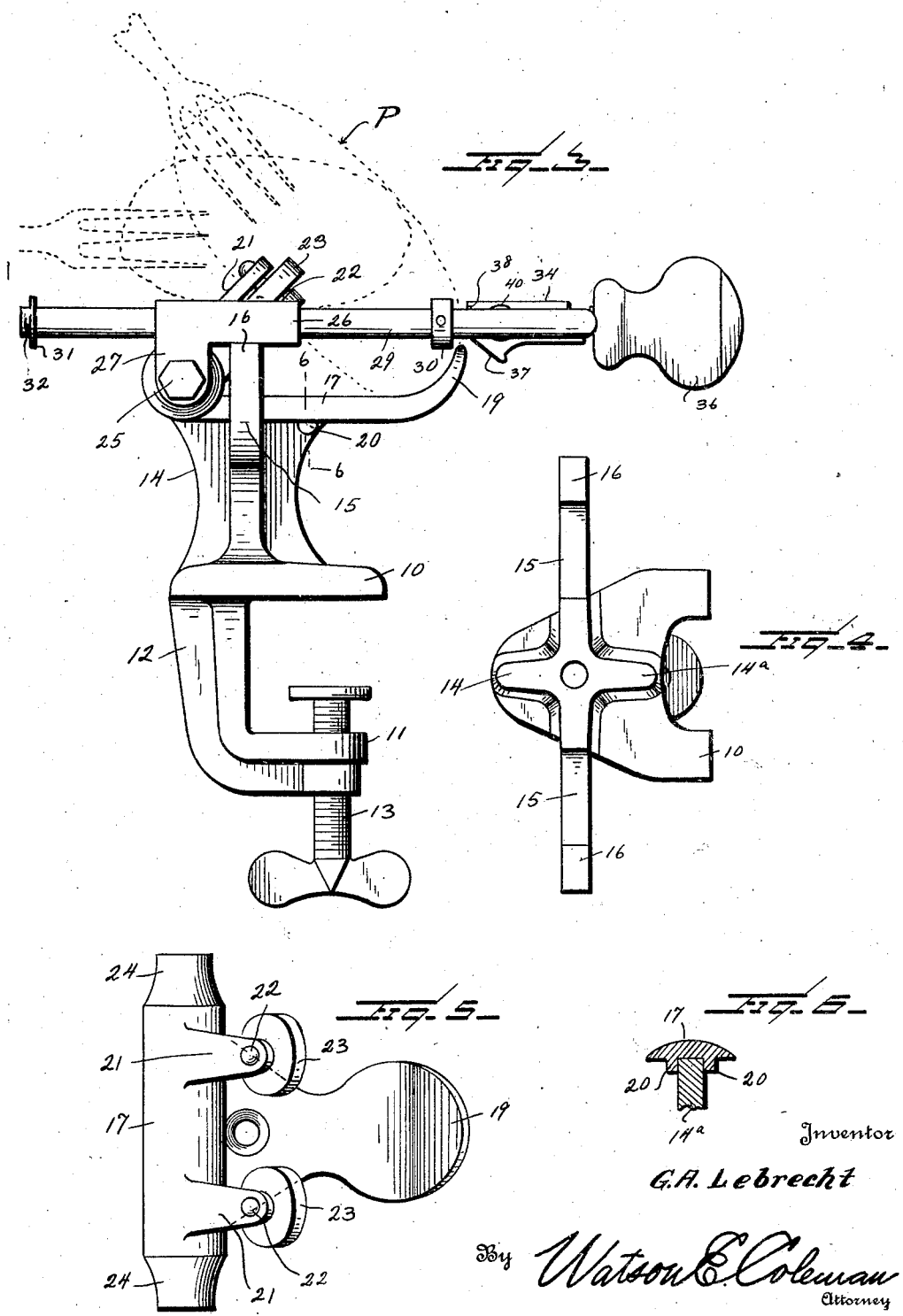

1,536,594

UNITED STATES PATENT OFFICE.

GEORGE ALBERT LEBRECHT, OF FREEPORT, ILLINOIS.

UTENSIL FOR PEELING OR SLICING VEGETABLES.

Application filed May 15, 1924. Serial No. 713,573.

*To all whom it may concern:*

Be it known that I, GEORGE ALBERT LE-BRECHT, a citizen of the United States, residing at Freeport, in the county of Stephenson and State of Illinois, have invented certain new and useful Improvements in Utensils for Peeling or Slicing Vegetables, of which the following is a specification, reference being had to the accompanying drawings.

This invention relates to peeling devices, and particularly to utensils for peeling or slicing potatoes and vegetables of this character.

The general object of my invention is to provide a culinary implement of a very simple and effective construction, which is so formed that a potato may be impaled upon a fork having straight prongs or like implement and disposed so that the cutting blade of the potato peeler may be used to peel the potatoes in a very simple and rapid manner.

A further object is to provide a device of this character which is thoroughly adjustable to all sizes of potatoes and which is readily separable so as to permit thorough cleansing of the different parts.

A still further object is to provide a construction of this character which is so formed in a plurality of parts that the separate parts may be readily cast or otherwise formed.

Another object is to provide a device of this character in which the blade is so arranged that it cannot cut the fingers of the user.

Still another object is to provide a device of this character wherein the potato being peeled is supported upon rollers so that the potato may be readily turned into convenient position for peeling.

Other objects have to do with the details of construction and arrangement of parts as will appear more fully hereinafter.

My invention is illustrated in the accompanying drawings, wherein:—

Figure 1 is a front elevation showing the cutter in its vertical position;

Figure 2 is a vertical section of the potato peeler showing the cutter being operated;

Figure 3 is a side elevation of the potato peeler showing the cutter in its depressed position;

Figure 4 is a top plan view of the base section of the cutter;

Figure 5 is a top plan view of the potato supporting section of the cutter;

Figure 6 is a section on the line 6—6 of Figure 3;

Referring to these drawings, it will be seen that I have provided a base which is adapted to be attached to the table. This base includes the clamping jaws 10 and 11 connected by the integral web 12 and the lower jaw 11 having therein the screw 13 which is adapted to be turned upward to bind against a table.

Above the jaw 10 the base extends upward in the form of a cruciform standard 14. This standard at its upper end, as shown in Figure 4, is provided with transversely extending arms 15, the upper ends of these arms being curved upward, as at 16. Adapted to be disposed upon these arms and upon the upper end of the cruciform standard 14 is a plate 17. This plate is adapted to be fastened to the base by means of a screw 18 which extends downward through the plate and into the base, the standard 14 having a screw-threaded aperture for engagement by this screw. The plate 17 forms a seat for the potato when the potato is placed in certain positions, as shown in Figure 2, and this base 17 is formed to provide a relatively long tongue 19, the outer end of the tongue being widened and curved upward. This tongue 19 is flat on the bottom and is concavely curved upon its upper face and at its end, as before stated, extends upward in a curve, as shown in Figure 3. The under face of the tongue is provided with two downwardly extending lugs 20 which are adapted to engage on each side of the outwardly projecting flange 14ª of the standard 14 so as to hold the plate 17 from any pivotal movement upon the screw 18. This plate 17 at its rear end is formed with upwardly and forwardly extending lugs 21, each lug being bifurcated, as at 22, and mounted in these bifurcated lugs are the rollers 23, these rollers being disposed at an angle of about 45° to the plate 17, there being two of these rollers spaced from each other. These rollers are preferably flat-faced. The extremities of this plate 17 are extended, as at 24, and have screw-threaded bores into which pivot screws 25 are adapted to extend.

Coacting with the base and mounted upon these screws 25 as upon pivots are the sleeves 26, these sleeves 26 being provided with downwardly projecting lugs 27 apertured for the passage of the screws 25. Thus it will be seen that these sleeves 26 may have oscillatory movement on the screws 25 which constitute trunnions for these sleeves.

Coacting with these sleeves 26 is a sliding yoke, which is designated generally 28 and which is U-shaped in form so as to provide two longitudinally extending parallel arms 29 which extend through the sleeves and are longitudinally shiftable within the sleeves. The shifting movement of these arms within the sleeves is limited by a stop collar 30 mounted upon one of the arms and by a washer 31 and cotter pin 32 mounted upon the extremity of the same arm. This, as before remarked, limits the sliding movement of this yoke within the sleeves.

The cross bar of the yoke carries upon it the knife casting 33. This is approximately U-shaped in form so as to provide a cross bar and two depending arms 34. The cross bar of the yoke is apertured for the passage of a bolt 35 which extends through a handle 36, the outer face of the yoke 38 being recessed for the reception of this handle. The legs of the yoke are relatively wide, as shown in Figure 1, and the lower edge of the yoke carries an integral, transversely extending guard 37 which is inclined downwardly and outwardly. The arms of the yoke at their lower ends are formed with a recess 38 and this guard comes down to and is flush with the top of this recess. Adapted to be disposed in this recess is a knife blade 39, the extremities of which are upwardly turned, as at 40, and formed with eyes for the passage of bolts 41 which pass through apertures in the arms 34 and are engaged by nuts 42. The knife blade is held slightly spaced from the guard 37 so that as the knife blade is used the peelings of the potato will pass into the space between the guard 37 and the knife blade and the peelings discharged, as shown in Figure 2.

In the use of this device, the potato P may be impaled upon a fork, the fork being extended through the potato lengthwise thereof. The potato may then be disposed upon the tongue 17 in the manner shown in dotted lines in Figure 3, and then as the potato is rotated around the longer axis of the potato, the handle 36 may be oscillated, causing the knife to travel down the length of the potato and peel the potato on the sides thereof. When the sides of the potato have been peeled, the potato may be elevated upon the wheels, as also shown in dotted lines in Figure 3, and as the potato is rotated the knife is used to cut off the skin at the end of the potato. The potato is then reversed upon the fork and a like operation performed upon the impaled end.

It will be seen that by reason of the fact that the yoke carrying the knife is adjustable longitudinally through the sleeves, it follows that the device will accommodate itself to either large or small potatoes and to potatoes of any form. The rollers 23 support the potato so that it may be readily turned or oscillated.

I have found in actual practice that this device will peel potatoes very effectively and quickly, and while it may be used in ordinary kitchens, it is particularly adapted for peeling large quantities of potatoes, as in hotels, restaurants and the like. The construction is simple, may be readily set up, and may be cheaply made.

While I have illustrated certain details of construction and arrangement of parts which I believe to be particularly effective, I do not wish to be limited thereto as it is obvious that many changes might be made in these details without departing from the spirit of the invention as defined in the appended claims.

I claim:—

1. A potato peeler comprising a base formed to provide a support for the potato, a peeling knife pivotally mounted upon the base at one end thereof for oscillation toward and from the base and for rectilinear movement toward and from its point of pivotal support, and means for supporting the potato at an angle to the base.

2. A potato peeler of the character described comprising a base, a member mounted upon the base at one end thereof for oscillatory movement toward or from the base, a knife mounted upon said member for oscillation therewith and for rectilinear movement toward and from said member, and means for supporting the potato upon the base at an angle thereto and to the rectilinear movement of the knife.

3. A potato peeler of the character described comprising a base formed to provide a seat for the potato, a member mounted upon the base for oscillatory movement toward or from the base, a knife support mounted in said member for rectilinear movement therein, a knife carried by said support, the knife support having a handle, and means for supporting the potato upon said seat at an angle to the base and to the rectilinear movement of the knife.

4. A potato peeler of the character described comprising a base, a knife support slidingly mounted upon the base and for oscillatory movement, the base being formed to support a potato in the path of movement of said knife, and a pair of rollers mounted upon the base between which the potato is adapted to be supported.

5. A potato peeler of the character described comprising a base formed to provide a seat for the potato to be peeled and having a pair of rollers adapted to engage the potato and support it on said seat, a U-shaped yoke pivotally mounted upon the base and having sliding movement, and a knife carried upon the yoke and movable therewith toward and from the potato and concentric to the pivotal axis of the yoke.

6. A potato peeler comprising a base having means whereby it may be clamped in position, the base being formed to provide a seat for the potato, a sleeve pivoted upon the base, a member having an arm sliding through the sleeve, said member extending substantially at right angles to the arm and having a knife carried thereby.

7. A potato peeler comprising a base having means whereby it may be clamped in position, the base being formed to provide a seat for the potato, a pair of sleeves pivotally mounted at opposite ends of the base, and a U-shaped yoke providing arms extending through said sleeves, and a cross bar, the arms having sliding movement in the sleeves, and a knife operatively mounted upon the cross bar.

8. A potato peeler comprising a base having means whereby it may be clamped in position, the base being formed to provide a seat for the potato, a pair of sleeves pivotally mounted at opposite ends of the base, a U-shaped yoke providing arms extending through said sleeves, a cross bar, the arms having sliding movement in the sleeves, and a knife operatively mounted upon the cross bar, the base being provided with a pair of rollers disposed at an acute angle to the base and adapted to engage a potato.

9. A potato peeler of the character described comprising a base formed to provide a seat for a potato, sleeves pivotally mounted upon the ends of the base at the rear thereof, the forward end of the base being formed to provide a seat for the potato and the base having upwardly extending lugs inclined to the plane of the base, rollers mounted in said lugs, a U-shaped yoke having arms slidingly mounted in said sleeves and having a cross bar provided with a handle, a knife support mounted upon said cross bar, and a knife carried upon said support.

10. A potato peeler comprising a base having clamping means, a plate forming part of the base and detachably mounted thereon, said plate being formed to provide an outwardly extending tongue forming a seat for the potato, the opposite end of the plate having upwardly and angularly extending lugs, a pair of rollers mounted upon said lugs and between which the potato is adapted to be supported, sleeves pivotally mounted upon the opposite ends of said plate, a U-shaped yoke having lugs sliding through said sleeves, a cross bar provided with a handle, means limiting the sliding movement of the arms through said sleeves, a knife support mounted upon the cross bar of the yoke, and a knife carried thereby.

11. A potato peeler comprising a base having clamping means, a plate forming part of the base and detachably mounted thereon, said plate being formed to provide an outwardly extending tongue forming a seat for the potato, the opposite end of the plate having upwardly and angularly extending lugs, a pair of rollers mounted upon said lugs and between which the potato is adapted to be supported, sleeves pivotally mounted upon the opposite ends of said plate, a U-shaped yoke having lugs sliding through said sleeves, a cross bar provided with a handle, means limiting the sliding movement of the arms through said sleeves, a U-shaped knife support mounted upon the yoke and formed to provide two downwardly projecting arms, the lower ends of the arms having a knife seat, a guard inclined to the knife seat, and a knife detachably supported upon said seat.

12. A potato peeler comprising a base having clamping means, a plate forming part of the base and detachably mounted thereon, said plate being formed to provide an outwardly extending tongue forming a seat for the potato, the opposite end of the plate having upwardly and angularly extending lugs, a pair of rollers mounted upon said lugs and between which the potato is adapted to be supported, sleeves pivotally mounted upon the opposite ends of said plate, a U-shaped yoke having lugs sliding through said sleeves, a cross bar provided with a handle, means limiting the sliding movement of the arms through the sleeves, a U-shaped knife support mounted upon the yoke and formed to provide two downwardly projecting arms, the lower ends of the arms having a knife seat, a guard inclined to the knife seat, a knife detachably supported upon the seat, the ends of the knife being turned upward, and means detachably engaging the ends of the knife with the arms of the knife support.

13. In a potato peeler, means for supporting a potato and a knife support mounted for movement toward or from the potato and oscillatory movement substantially at right angles to the plane of the first named movement, the knife support having two parallel arms, the extreme lower ends of the arms being formed with a knife seat and the lower ends of the arms to one side of the knife seat having an inclined guard extending nearly to the knife seat.

14. A potato peeler of the character described comprising a base having clamping means, the base being formed to provide a relatively flat upper face extending rearward in the form of an upwardly curved tongue, said tongue constituting a seat for the potato, the opposite end of the base being formed with upwardly and forwardly extending bifurcated lugs, a pair of rollers mounted in said lugs and disposed at an angle to the base, a pair of sleeves having downwardly extending lugs pivoted to the ends of said plate below and outward of the lugs, a yoke slidingly mounted in said sleeves and oscillatable with the sleeves, the yoke having a cross bar and a handle, and a knife support operatively mounted upon the cross bar.

In testimony whereof I hereunto affix my signature.

GEORGE ALBERT LEBRECHT.